United States Patent
Khasin

(10) Patent No.: US 10,954,584 B2
(45) Date of Patent: Mar. 23, 2021

(54) METAL OXIDE PARTICLES AND METHOD OF PRODUCING THEREOF

(71) Applicant: PHINERGY LTD, Lod (IL)

(72) Inventor: Ernst Khasin, Rehovot (IL)

(73) Assignee: PHINERGY LTD., Lod (IL)

(*) Notice: Subject to any disclaimer, the term of this patent is extended or adjusted under 35 U.S.C. 154(b) by 0 days.

(21) Appl. No.: 16/207,440

(22) Filed: Dec. 3, 2018

(65) Prior Publication Data
US 2019/0112689 A1 Apr. 18, 2019

Related U.S. Application Data

(63) Continuation of application No. 15/071,292, filed on Mar. 16, 2016, now Pat. No. 10,144,991.
(Continued)

(51) Int. Cl.
*C01G 23/04* (2006.01)
*C22B 34/12* (2006.01)
(Continued)

(52) U.S. Cl.
CPC ............ *C22B 34/124* (2013.01); *C01B 13/32* (2013.01); *C01G 1/02* (2013.01); *C01G 23/04* (2013.01);
(Continued)

(58) Field of Classification Search
CPC ....... C22B 34/124; C22B 7/007; C22B 47/00; C01B 13/32; C01G 1/02; C01G 23/053; C01G 23/04; C22F 1/16; C22C 22/00; C22C 1/02; C01P 2006/80; C01P 2004/50; C01P 2004/03; C01P 2002/72; C01P 2004/64; C01P 2006/12; C01P 2004/62
See application file for complete search history.

(56) References Cited

U.S. PATENT DOCUMENTS 5,476,535 A 12/1995 Khasin
5,840,111 A 11/1998 Wiederhoft et al.
(Continued)

FOREIGN PATENT DOCUMENTS

CN 103771510 A 5/2014
EP 2399868 A1 12/2011
(Continued)

OTHER PUBLICATIONS

Marbán, Gregorio, Antonio B. Fuertes, and Teresa Valdés-Solís. "Templated synthesis of high surface area inorganic oxides by silica aquagel-confined co-precipitation." Microporous and Mesoporous Materials 112.1-3 (2008): 291-298.*
(Continued)

*Primary Examiner* — Richard M Rump
(74) *Attorney, Agent, or Firm* — Pearl Cohen Zedek Latzer Baratz LLP

(57) ABSTRACT

Methods of producing high purity powders of submicron particles of metal oxides are presented. The methods comprise providing or forming an alloy of a first metal with a second metal, optionally heating the alloy, subjecting the alloy to a leaching agent to remove the second metal from the alloy and to oxidize the first metal, thus forming submicron oxide particles of the first metal. Collections of high purity, high surface area, submicron particles are presented as well.

19 Claims, 2 Drawing Sheets

Related U.S. Application Data

(60) Provisional application No. 62/134,691, filed on Mar. 18, 2015.

(51) Int. Cl.

| | | |
|---|---|---|
| *C22F 1/16* | (2006.01) | |
| *C22C 22/00* | (2006.01) | |
| *C22C 1/02* | (2006.01) | |
| *C22B 47/00* | (2006.01) | |
| *C22B 7/00* | (2006.01) | |
| *C01G 23/053* | (2006.01) | |
| *C01G 1/02* | (2006.01) | |
| *C01B 13/32* | (2006.01) | |

(52) U.S. Cl.
CPC ............ *C01G 23/053* (2013.01); *C22B 7/007* (2013.01); *C22B 47/00* (2013.01); *C22C 1/02* (2013.01); *C22C 22/00* (2013.01); *C22F 1/16* (2013.01); *C01P 2002/72* (2013.01); *C01P 2004/03* (2013.01); *C01P 2004/50* (2013.01); *C01P 2004/62* (2013.01); *C01P 2004/64* (2013.01); *C01P 2006/12* (2013.01); *C01P 2006/80* (2013.01)

(56) References Cited

U.S. PATENT DOCUMENTS

| | | | | |
|---|---|---|---|---|
| 7,264,787 | B2* | 9/2007 | Katusic | B01J 23/10 |
| | | | | 106/3 |
| 7,413,726 | B2 | 8/2008 | Surender et al. | |
| 7,758,844 | B2* | 7/2010 | Shio | B82Y 30/00 |
| | | | | 423/610 |
| 2005/0214200 | A1 | 2/2005 | Surender et al. | |
| 2012/0024799 | A1* | 2/2012 | Chen | B01J 20/0222 |
| | | | | 210/749 |

FOREIGN PATENT DOCUMENTS

| | | | |
|---|---|---|---|
| JP | 2014-533650 | | 12/2014 |
| JP | 2016-6003 | | 1/2016 |
| KR | 20130097882 A | * | 9/2013 |
| WO | WO 2013/074812 | | 5/2013 |
| WO | WO 2014/186207 A2 | | 11/2014 |

OTHER PUBLICATIONS

Alizadeh-Gheshlaghi, Ebrahim, et al. "Investigation of the catalytic activity of nano-sized CuO, Co3O4 and CuCo2O4 powders on thermal decomposition of ammonium perchlorate." Powder technology 217 (2012): 330-339.*
Chun, Jinyoung, et al. "Easy access to efficient magnetically recyclable separation of histidine-tagged proteins using superparamagnetic nickel ferrite nanoparticle clusters." Journal of Materials Chemistry 21.18 (2011): 6713-6717.*
Zhao, Baobao, and Zhaodong Nan. "One-pot synthesis of ZnLa x Fe 2—x O 4 clusters without any template and their possible application in water treatment." Journal of Materials Chemistry 22.14 (2012): 6581-6586.*
Zhuang, Jiandong, et al. "Precursor morphology-controlled formation of perovskites CaTiO3 and their photo-activity for As (III) removal." Applied Catalysis B: Environmental 156 (2014): 108-115.*
Cherif, N. Fodil, et al. "Preparation of Cobalt Titanate Nanoparticles and Their Photocatalytic Activity Toward Methylene Blue." (Year: 2014).*
Deshpande, S. B., et al. "Room temperature synthesis of mesoporous aggregates of anatase TiO2 nanoparticles." Materials Chemistry and Physics 97.2-3 (Year: 2006): 207-212.*
Bian, Hongyuan et al., "Metallurgical Technology", Institute et al., Beijing Institute of Technology Press, p. 142 and 143, Jan. 31, 2007.
Office Action for Chinese Patent Application No. 2016800161848, dated Mar. 1, 2019.
Office Action for Chinese Patent Application No. 2016800161848, dated May 31, 2019.
Cahn RW "Binary Alloy Phase Diagrams" Second edition, ASM International, Dec. 1990. vol. 3, p. 2615.
Chen et al. "Titanium dioxide nanomaterials: synthesis, properties, modifications, and applications". Chem. Rev. Jun. 23, 2007; 107(7): pp. 2891-2959.
International Search Report for PCT Application No. PCT/IL2016/050284 dated Jun. 30, 2016.
Li, Jie, et al. "effects of annealing temperature on dealloying of Ti—Cu Alloy." Corrosion Science 91 (2015): pp. 95-100.
Liu, Zhifu, et al. "Dealloying derived synthesis of W nanopetal films and their transformation into WO3." The Journal of Physical Chemistry C 112.5 (2008): pp. 1391-1395.
Bayoumi, Fathy M., and Badr G. Ateya. "Formation of self-organized titania nano-tubes by dealloying and anodic oxidation." Electrochemistry Communications 8.1 (2006): pp. 38-44.
Wang, Dong Jun, et al. "Nanosized metal oxide and nanobelts prepared by selective dealloying of Ti-based amorphous powders." Langmuir 29.25 (2013): pp. 8108-8115.
Supplementary European Search Report for European Application No. 16764339.4 dated Oct. 15, 2018.

* cited by examiner

METAL OXIDE PARTICLES AND METHOD OF PRODUCING THEREOF

CROSS-REFERENCE TO RELATED APPLICATIONS

This Application is a continuation of U.S. patent application Ser. No. 15/071,292, filed on Mar. 16, 2016, which claims priority from U.S. Provisional Patent Application No. 62/134,691, filed Mar. 18, 2015, all of which are hereby incorporated in their entirety.

FIELD OF THE INVENTION

This invention relates to high purity, fine particles of metal oxides and to methods for producing such particles and powders.

BACKGROUND OF THE INVENTION

In modern technology, metal oxide powders and in particular powders comprising submicron (superfine) metal oxide particles are vastly used. For example, superfine iron oxides are used for chemical processing including synthesis, cracking and oxidation. Iron oxides (II, III) are used in the manufacture of magnetic storage devices. Submicron powders of zirconium oxide ($ZrO_2$) have revolutionary application for ceramics used in aerospace defense industry as a heat shield of the space shuttle shell, missile radar shield etc. Successful application of submicron metal oxides to electrodes of lithium-ion batteries was reported in numerous publications.

There are many uses for titanium oxide powders and particularly titanium dioxide powders. Such uses include pigments for paint and coating, coloring agent in the food industry, materials (particularly substrate) for catalysts used in the chemical industry, materials for electrochemical power sources etc.

There is a huge demand for titanium oxide powders and in particular for nano-size titanium dioxide powder in the painting and cosmetic industries, in medicine and in numerous R&D teams developing new and improved sorts of traditional materials.

Titanium oxide nano-powders may be produced by many methods, including evaporation of liquid titanium tetrachloride ($TiCl_4$) at about 150° C. followed by mixing its vapor with air and hydrogen and heating the gaseous mix in a special reactor at a temperature of up to 2500° C. where nano size particles of $TiO_2$ and hydrochloric acid (HCl) are formed. The minimum size of the particles is approximately 20 nm. $TiO_2$ nanoparticles could also be synthesized by low temperature chemical reactions, but those processes require high cost surfactants and titanium precursors. Moreover, all the processes described above could not guarantee manufacturing of a final product having a controlled crystalline structure.

Therefore, there is a need for an efficient, low cost method for preparing high-purity nano-sized powders of metal oxides (e.g. titanium oxides).

SUMMARY OF THE INVENTION

The present invention relates to a method of producing high purity submicron (or nano-sized) metal oxide powders or powders of metal oxide combinations.

This invention is particularly applicable for producing titanium oxide powders. One object of the present invention is to provide a method of producing metal oxide powder, particularly titanium oxide powder having controlled crystalline phase content, fine prime particle and narrow particle size distribution. The method provides a more efficient and less expensive manufacturing procedure than obtainable by current techniques.

It is known that there is a family of so called "oxidizing acids". Among them are hydrochloric (HCl), sulfuric ($H_2SO_4$), nitric acid ($HNO_3$) and some other organic and inorganic acids. Those acids have strong oxidizing power and enable the oxidation of some metals directly. Among those metals are copper, titanium, iron, cobalt, chromium, nickel, molybdenum, lanthanum, niobium, zirconium, hafnium, vanadium, tungsten and others.

In one embodiment, this invention makes use of such oxidizing acids in a process for preparing metal oxide powders with controlled crystalline phase content, nano-sized particles and narrow particle size distribution.

According to this aspect and in one embodiment, this invention make use of an alloy containing:
metal or few metals, referred to as "the first metal(s)"; and
a second metal, referred to as "the second metal".

The first metal is present in the final metal-oxide product formed by processes of this invention. The second metal is removed from the alloy by a process comprising the application of an oxidizing acid. Removal of the second metal leaves the first metal which is being oxidized along the leaching operation of the oxidizing acid.

In other words the oxidizing acid in this technology has two functions:
1. To remove a second metal from the precursor alloy;
2. To fully oxidize the first metal to metallic oxide submicron (nano) particles. According to the present invention, there is provided a method for producing nanoparticles of a first metal oxide, the method comprising:

providing or forming an alloy of the first metal with a second metal;
subjecting the alloy to a heat treatment to fix a certain phase composition;
subjecting the heat treated alloy to a leaching agent effective to leach out (remove) the second metal and to fully oxidize the first metal, thus leaving the first metal oxide in a form of agglomerated nanoparticles; and
removing the leaching agent, leaving the first metal oxide.

In one embodiment, the method further comprising drying and annealing the first metal oxide.

In one embodiment, this invention provides a method of producing submicron metal oxide particles of one or more first metal(s), the method comprising:
providing or forming an alloy of the first metal(s) with a second metal;
subjecting the alloy to a heat treatment operation;
subjecting the alloy to a leaching agent effective to leach out the second metal and to oxidize the first metal(s), thus forming metal oxide submicron particles of the first metal(s);
removing the leaching agent, leaving the metal oxide submicron particles of the first metal(s).

By this method, metal oxides with high surface area and high purity are formed. By this method, compound oxides and complex oxides like spinel or perovskite are produced in one embodiment.

In one embodiment, the heat treatment step is optional. According to this aspect and in one embodiment, this invention provides a method of producing submicron metal oxide particles of one or more first metal(s), the method comprising:

provising or forming an alloy of a first metal(s) with a second metal;

subjecting the alloy to a leaching agent effective to leach out the second metal and to oxidize the first metal(s), thus forming metal oxide submicron particles of the first metal(s);

removing the leaching agent, leaving the metal oxide submicron particles of the first metal(s).

In one embodiment, the method further comprises a step of subjecting the alloy to a heat treatment operation.

In one embodiment, the heat treatment step is conducted following the step of providing or forming an alloy and prior to the step of subjecting the alloy to a leaching agent.

In one embodiment, this invention provides metal oxide particles, wherein the size of the metal-oxide particles ranges between 3 nm and 200 nm, and wherein the specific surface area of the particles is higher than 70 m$^2$/g. In one embodiment, the specific surface area of the particles is higher than 100 m$^2$/g. The surface area of the particles refers to the surface area of a collection of particles in one embodiment.

In one embodiment, this invention provides clusters comprising the metal oxide particles of the invention, wherein the size of the metal-oxide particles ranges between 3 nm and 200 nm, and wherein the specific surface area of the particles is higher than 70 m$^2$/g. In one embodiment, the specific surface area of the particles is higher than 100 m$^2$/g.

The invention is particularly useful for producing titanium oxide and titanium dioxide nanoparticles wherein in the alloy used for producing the particles, the first metal is titanium, the second metal is manganese and the phase formed by the heat treatment step is αMn solid solution having complex body centered crystalline structure and wherein the leaching agent is nitric acid ($HNO_3$) having a concentration ranging between 3-50%. In one embodiment, the $HNO_3$% and/or oxidizing agent refer to a wt % of $HNO_3$ in an aqueous solution.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
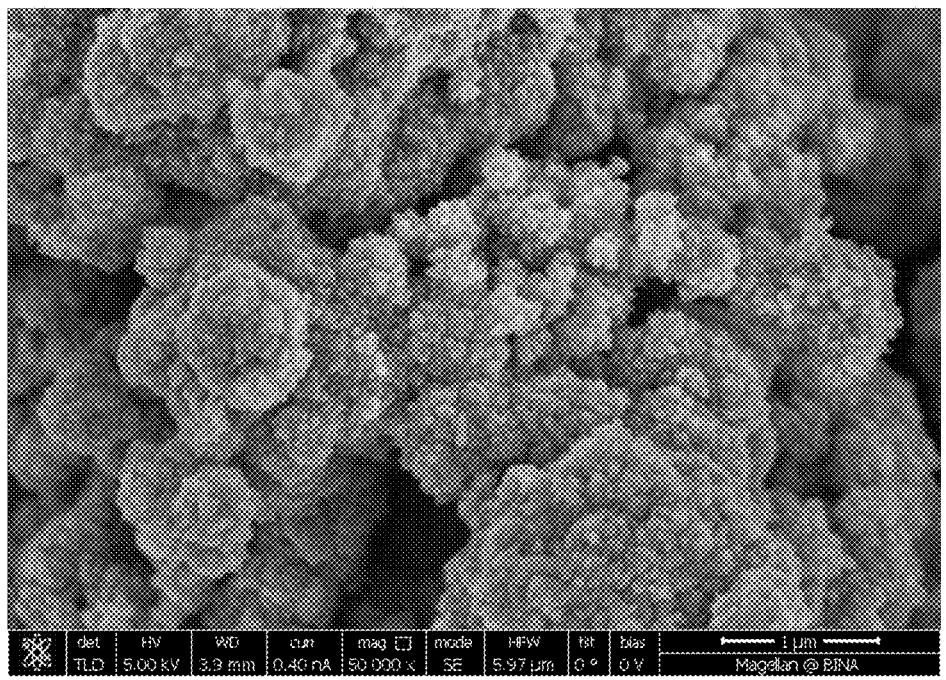
FIG. 1 is a SEM image of titanium oxide porous clusters having rounded shape and average size of approximately 0.5-2.0 micron.
Figure 2:
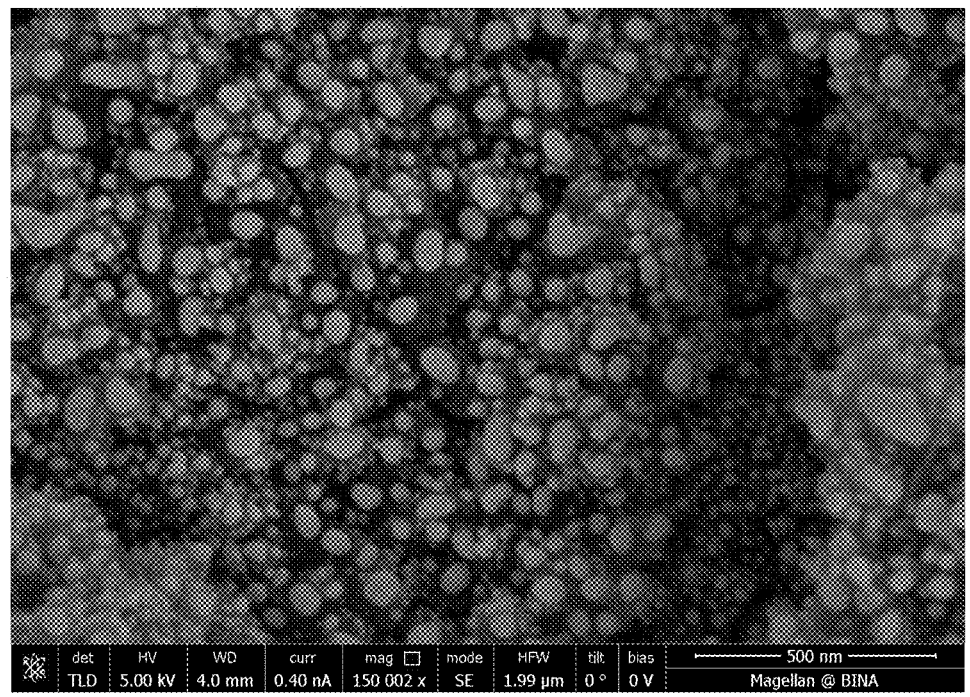
FIG. 2 is a SEM image of titanium oxide primary (prime) nanoparticles. The primary components of the cluster's structure are nanoparticles having diameter range of approximately 5-180 nm and average particle size about 30-40 nm.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Oxides of the Invention

In one embodiment, this invention provides metal oxide particles, wherein the size of the metal-oxide particles ranges between 3 nm and 200 nm, and wherein the specific surface area of the particles is higher than 70 m$^2$/g.

In one embodiment, the metal base purity of the particles is more than 99%. In one embodiment, the metal(s) in the metal oxide is selected from the group consisting of Ti, Fe, Zr, Hf, Cu, Co, Cr, Ni, Mo, La, Nb, V, W and others and combinations thereof. In one embodiment, the metal in the metal oxide is Ti.

In one embodiment, the size of the particles ranges between 3-20 nm. In one embodiment, the size of the particles ranges between 3-100 nm. In one embodiment, the size of the particles ranges between 3-50 nm. In one embodiment, the size of the particles ranges between 10-20 nm. In one embodiment, the size of the particles ranges between 10-100 nm. In one embodiment, the size of the particles ranges between 50-150 nm. In one embodiment, the size of the particles ranges between 5-50 nm. In one embodiment, the size of the particles ranges between 100-200 nm. In one embodiment, the size of the particles ranges between 3-150 nm or between 3-200 nm. In one embodiment, the size of the particles ranges between 3-1000 nm or between 3-5000 nm. In one embodiment, the size of the particles ranges between 10-1000 nm, or between 100-1000 nm, or between 1000-5000 nm. In one embodiment, the size of the particles is up to a few microns. In one embodiment, the size of the particles is up to up to 5 microns, up to 3 microns or up to 1 micron.

In one embodiment, the crystalline structure of the titanium oxide is titanium dioxide ($TiO_2$) or a mix of titanium dioxide ($TiO_2$) with other types of titanium oxides (TiO). In one embodiment, the specific surface area of the titanium oxide particles is more than 100 m$^2$/g.

In one embodiment, this invention provides clusters comprising the metal oxide particles described herein above.

In one embodiment, this invention provides metal oxide particles (or metal oxide prime particles). In one embodiment, this invention provides nano-porous agglomerates (or clusters) comprising particles of the invention. Prime particles are the particles from which the clusters (or agglomerates) are made of. Each cluster or agglomerate comprises a collection of prime particles.

In one embodiment, the specific surface area of the metal oxide particles measured by the B.E.T. method is ranging between 25-200 m$^2$/g. In one embodiment, the specific surface area ranges between 25 and 100 m$^2$/g or between 100 and 200 m$^2$/g or between 25 and 50 m$^2$/g or between 50 and 150 m$^2$/g. In one embodiment, the specific surface area of the metal oxide particles measured by the B.E.T. method is more than 70 m$^2$/g. In one embodiment, the specific surface area of the metal oxide particles measured by the B.E.T. method is more than 100 m$^2$/g.

In one embodiment, the metal(s) in the metal oxide is any metal that forms a stable oxide upon oxidation with an oxidizing acid. In one embodiment, the metal(s) in the metal oxide is/are selected from the group consisting of Ti, Fe, Zr, Hf, Cu, Co, Cr, Ni, Mo, La, Nb, V, W and combinations thereof. In one embodiment, the metal(s) in the metal oxide is selected from the group consisting of Ti, Fe, Zr, Hf and combinations thereof.

In one embodiment, the metal in the metal oxide is Ti. In one embodiment, the crystalline structure of the titanium oxide is titanium dioxide (TiO$_2$) or a mix of titanium dioxide (TiO$_2$) with other types of titanium oxides (TiO).

In one embodiment, the specific surface area of the titanium oxide particles is more than 100 m$^2$/g.

In one embodiment, this invention provides metal oxide particles, wherein the particle size ranges between 10 nm and 100 nm.

In one embodiment, this invention provides metal oxide particles, wherein the size of the metal-oxide particles ranges between 3 nm and 200 nm, between 10 nm and 100 nm, between 3 nm and 50 nm, between 20 nm and 50 nm, between 3 nm and 150 nm, between 25 nm and 125 nm. In one embodiment, larger metal oxide particles are provided by this invention. Metal oxide particles with a size ranging between 3 nm and 5 microns are provided by this invention. In one embodiment, the size of the particles ranges between 3 nm and 5000 nm, between 10 nm and 1000 nm, 100 nm and 1000 nm, 1000 nm and 5000 nm, 500 nm and 2500 nm, 2500 nm and 5000 nm. In one embodiment, this invention provides micro-particles, i.e. particles with a size range in the micrometer range. In one embodiment, this invention provides a collection of particles comprising submicron particles and micro-particles.

In one embodiment, the difference between minimum and maximum particle size in powders of this invention is no more than 10 times.

In one embodiment, powders comprising particles of this invention (or collections of particles of this invention) have high surface area. In one embodiment, high surface area powders of this invention further comprise material purity of more than 99%. This combination of high surface area and high purity makes the particles of this invention unique. Such combination of properties is not known in the art.

In one embodiment, D50 (the average particle size) is in the range of 20-50 nm. In one embodiment, D50 is in the range of 10-100 nm, or 10-70 nm.

In one embodiment, this invention provides clusters comprising metal oxide particles as described herein above.

In one embodiment clusters of the metal oxide particles comprise a nano-porous structure, useful for catalytic processes.

In one embodiment, the nano porous structure refers to porous clusters of metal oxide particles.

In one embodiment, the size of agglomerates (clusters) of this invention ranges between 0.5 micron to 5-7 micron (micron=micrometer). In one embodiment, the size of the clusters ranges between 0.5 micron and a few microns. In one embodiment, the size of the clusters ranges between 0.1 micron and a few microns. In one embodiment, the size of the clusters ranges between 0.05 microns and a few microns (micron=micrometer).

In one embodiment, metal oxide clusters of this invention comprise submicron (or nano-sized) porous structure with average pore size of 1-20 nm. In one embodiment, metal oxide clusters of this invention comprise porous structure with average pore size of 5-15 nm. In one embodiment, metal oxide clusters of this invention comprise submicron (or nano-sized) porous structure with average pore size of 1-50 nm. In one embodiment, metal oxide clusters of this invention comprise submicron (or nano-sized) porous structure with average pore size of 5-10 nm, 10-15 nm, 15-20 nm. In one embodiment, metal oxide clusters of this invention comprise a maximal pore size of 20 nm. In one embodiment, metal oxide clusters of this invention comprise a maximal pore size of 15 nm. In one embodiment, the average pore size of the metal oxide clusters is less than 50 nm, or less than 40 nm, or less than 30 nm, or less than 20 nm, or less than 15 nm, or less than 10 nm, or less than 5 nm. In one embodiment, metal oxide clusters of this invention comprise total porosity of up to 20%, or up to 30%, or up to 40%, or up to 50%, or up to 60% or up to 70%. In one embodiment, metal oxide clusters of this invention comprise total porosity of up to 80%. In one embodiment, metal oxide clusters of this invention comprise total porosity ranging between 10-40%. In one embodiment, metal oxide clusters of this invention comprise total porosity ranging between 25%-35%, or between 10%-40%, or between 5%-50% or between 40%-80%. In one embodiment, the pore size refers to pores inside the agglomerates/clusters.

In one embodiment, the formed collection of metal oxide particles comprise some particles comprising one metal oxide phase and other particles comprising another metal oxide phase. In one embodiment, some particles comprise titanium oxide (TiO) phase or phases and other particles comprise titanium dioxide (TiO$_2$) phase. In one embodiment, each particle has only one oxide phase. In one embodiment, each particle has one oxide phase and the collection of particles comprises some particles of a certain phase and other particles of a different phase.

In one embodiment, the metal oxide particles formed by methods of this invention are of controlled phase content.

Methods of Preparation of Metal Oxides

In one embodiment, this invention provides a method of producing submicron metal oxide particles of one or more first metal(s), the method comprising:

providing or forming an alloy of the first metal(s) with a second metal;

optionally subjecting the alloy to a heat treatment operation;

subjecting the alloy to a leaching agent effective to leach out the second metal and to oxidize the first metal(s), thus forming metal oxide submicron particles of the first metal(s);

removing the leaching agent, leaving the metal oxide submicron particles of the first metal(s).

In one embodiment, the method further comprising rinsing and drying the oxide particles of the first metal(s). In one embodiment, the method further comprising rinsing and drying the first metal(s) oxide particles following removal of the leaching agent. In one embodiment, rinsing is conducted in order to remove the leaching agent, portions thereof or traces thereof. Accordingly, rinsing is part of the process of removing the leaching agent in some embodiments.

In one embodiment, the rinsing is conducted in water and is stopped when the water following rinsing is neutral or close to neutral in terms of pH.

In one embodiment, the heat treatment step is conducted following the step of providing or forming an alloy and prior to the step of subjecting the alloy to a leaching agent. In one embodiment, the heat treatment temperature is any temperature that is necessary to fix the phase of the metals in the alloy. The heat treatment temperature depends on the metals and can vary depending on the metals used.

Similarly, the melting temperature that is used to melt the mixture comprising the first metal and the second metal may vary. This temperature depends on the metals used to form the alloy. Any metal-melting temperature can be used for metal-melting and for heat treatment of alloys of this invention as known in the art.

In one embodiment, the heat treatment forms a homogeneous phase or homogeneous phases in the alloy, from which the second metal is removed and the first metal(s) is oxidized by the leaching agent. In one embodiment, the alloy comprises 1-50 wt % of the first metal and 50-99 wt % of the second metal. In one embodiment, the alloy after heat treatment undergoes surface cleaning operation. In one embodiment, the alloy is subjected to a grinding operation before the heat treatment or before the leaching step. In one embodiment, the heat treatment is used in order to achieve a certain phase (phases) in the alloy.

In one embodiment, the leaching agent used for the leaching operation enables the first metal(s) oxidation. In one embodiment, the leaching agent used for the leaching operation oxidizes the first metal(s). In one embodiment, the leaching agent used for the leaching operation reacts chemically with the first metal(s), thus forming an oxide of the first metal(s).

In one embodiment, the leaching agent comprises at least two chemical agents.

In one embodiment, the first of the chemical agents affects oxidation of the first metal(s) and a second of the chemical agents affects leaching of the second metal. In one embodiment, the at least two chemical agents affect both oxidation of the first metal(s) and leaching of the second metal.

In one embodiment, the first metal(s) oxidation results in a homogeneous metal oxide particle structure. In one embodiment, a homogeneous metal oxide particle structure means that each particle in the collection of particles formed comprise a single crystalline phase.

In one embodiment, homogeneous structure means a uniform structure. For example and in one embodiment, the homogeneous structure comprises only two types of metal oxides (e.g. Rutile $TiO_2$ and Hongquiite TiO) and nothing more.

In one embodiment, the first metal is titanium and the second metal is manganese.

In one embodiment, the leaching agent is an acid. In one embodiment, the leaching agent comprises an acid. In one embodiment, the leaching agent is an acidic solution. In one embodiment, the leaching agent is or comprises nitric acid. In one embodiment, the leaching agent is or comprises nitric acid ($HNO_3$), hydrochloric acid (HCl), sulfuric acid ($H_2SO_4$) or a combination thereof. In one embodiment, the leaching agent is a mixture of acids. In one embodiment, the acids used are used as acid solutions. In one embodiment, acid solutions are aqueous solutions, i.e. acid dissolved in water. In one embodiment, the acid concentration is ranging between 3-50%. In one embodiment, the concentration percent is wt %. In one embodiment, the solution is aqueous solution. The solution comprises acid and water in some embodiments. In another embodiment, the acid concentration is ranging between 10-30% in aqueous solution. In another embodiment, the acid concentration is ranging between 20-50% in aqueous solution.

In one embodiment, the leaching agent comprises other organic or inorganic acids or combinations thereof.

In one embodiment, the first metal(s) is any metal that forms a stable oxide upon oxidation with an oxidizing acid. In one embodiment, the first metal(s) is selected from the group consisting of Ti, Fe, Zr, Hf, Cu, Co, Cr, Ni, Mo, La, Nb, Ta, W, V and combinations thereof. In one embodiment, the first metal(s) is selected from the group consisting of Ti, Fe, Zr, Hf and combinations thereof. Other metals can be used as first metal(s) in methods of this invention.

In one embodiment, the first metal in the metal oxide is Ti. In one embodiment, the crystalline structure of the titanium oxide formed by methods of this invention is titanium dioxide ($TiO_2$) or a mix of titanium dioxide with other types of titanium oxides (TiO).

In one embodiment, the second metal is any metal that can be leached from the alloy and can provide the first metal oxide as discussed above. In one embodiment, the second metal of the alloy is chosen from: Mn, Mg, Zn, Ca, Ba, Sn, Pb, Be, Cd, Tl, Al, B and combinations thereof. Other metals can be used as second metal(s) in methods of this invention.

In one embodiment, rinsing of the metal oxide after the leaching process is conducted until the rinsing water (following rinsing) becomes neutral in terms of pH (i.e. pH=7). Rinsing with water until neutral pH is achieved, assures that all the acid from the leaching process is cleaned and washed away from the particles. Rinsing can be performed with water only in some embodiments. Rinsing with water comprising a base (pH>7.0) is conducted in other embodiments. Other solvents can be used in the rinsing process following water rinsing (e.g. ethanol, acetone etc.). Organic solvents can be added to the rinsing water in some embodiments. Other aqueous solutions can be used to wash the formed powders (particles). In some embodiments, it is sufficient to achieve a pH value close to neutral for the rinsing water/rinsing solutions following powder rinsing. According to this aspect and in one embodiment, the pH of the rinsing water/solution following rinsing ranges between 6-8, or between 5-9, or between 6.5 and 7.5 in some embodiments. In some embodiments, the pH of the rinsing water/solutions following rinsing is determined using pH paper or pH meter. Other pH-sensitive techniques can be used, e.g. reaction with a color-changing agent in solution.

In one embodiment, the metal oxide after leaching and rinsing to a neutral reaction undergoes heating for dewatering and for annealing.

In one embodiment, the metal oxide formed after leaching and rinsing to a neutral reaction, undergoes a heating step for dewatering and for annealing.

In one embodiment, the first metal is titanium, the second metal is manganese and the oxidizing acid is nitric acid ($HNO_3$). In one embodiment, the crystalline structure of the metal oxide is titanium dioxide ($TiO_2$) or a mix of titanium dioxide with other types of titanium oxides (TiO). In one embodiment, the titanium dioxide phase is Rutile and the titanium oxide phase is Hongquiite. In one embodiment, the concentration of titanium dioxide phase is 90% and the concentration of titanium oxide is 10% of the total titanium oxide particle collection.

Other crystalline structures and other chemical compositions/phase compositions may be formed using methods of this invention.

In one embodiment, the specific surface area of the final titanium oxide particles is more than 70 m²/g. In one embodiment, the step of forming an alloy comprises mixing a solid of the first metal with a solid of the second metal and heating the mixture such that a melt is formed. In one embodiment, the mixture comprises 8% Ti and 92% Mn (wt ratio). In one embodiment, the first metal and the second metal used for the mixture are in a powder form, a granules form or a combination thereof. In one embodiment, heating the metal mixture to form a melt is conducted in a melting furnace under noble gas protective atmosphere.

In one embodiment, the methods of this invention make use of an alloy comprising a metal or few metals (referred to as "the first metal" or "the first metal(s)"); and a second metal. In another embodiment the alloy includes titanium and manganese.

According to the Ti—Mn binary phase diagram (Binary Alloy Phase Diagrams, Second Edition, Volume 3, ASM International, p. 2615), the following phases, enriched with manganese could be chosen as the raw materials for producing titanium dioxide nanoparticles according to methods of this invention:

1. δMn solid solution having body centered cubic (BCC) crystalline structure.
2. γMn solid solution having face centered cubic (FCC) crystalline structure.
3. βMn solid solution having complex cubic crystalline structure.
4. αMn solid solution having complex centered cubic (CBCC) crystalline structure.
5. TiMn₄ or Ti₂Mn₉ (according to different references) intermetallic compound having not clearly identified crystalline structure.

Other metallurgical reactions and phases are applicable to methods, alloys and particles of this invention.

All the phases mentioned above can be fixed by different kinds of heat treatments. Fixing a phase means to obtain an alloy having crystalline structure containing only this particular phase. Particularly αMn solid solution could be fixed by solid solution heat treatment (SSHT) involving heating up an alloy containing more than 90% of manganese to a temperature in the range of 850° C.-1070° C. (e.g. 950° C.) in protective atmosphere, soaking the alloy at this temperature for a few hours, followed by water quenching.

In one embodiment, methods of this invention comprise a step of leaching the alloy. In one embodiment, for a Ti/Mn alloy, the manganese is leached from the quenched alloy using 3-50 wt % nitric acid (HNO₃) in aqueous solution at a temperature of 20-50° C.

Redox chemical reactions involving metals and nitric acid are a very complicated issue. The route of reaction depends on the concentration of the acid, temperature of the process and the nature of the metal. According to some scientific publications, a highly diluted nitric acid could behave as a typical acid and most of the metals including manganese, magnesium, zinc and others (actually most of the metals having standard redox potential more negative than hydrogen) liberate hydrogen when reacted with the acid, e.g.:

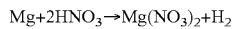

Mg+2HNO₃→Mg(NO₃)₂+H₂

On the other hand, less diluted nitric acid of moderate concentration could behave as an oxidizer and could be reduced to different nitrogen containing compounds:

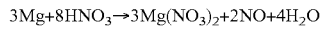

3Mg+8HNO₃→3Mg(NO₃)₂+2NO+4H₂O

In one embodiment, the metals which are used as the second metals for a precursor alloy of this invention are: Mn, Mg, Zn, Ca, Ba, Sn, Pb, Be, Cd, Tl, Al and others.

With regard to the reaction of direct metal oxidation by nitric acid, it should be admitted that this is a very complicated and not finally determined issue. It is known that nitric acid has strong oxidizing power (apparently, nitrogen which is present in diluted nitric acid as a nitrate ion could be a strong oxidizing component) and enables the oxidation of some metals and in particularly titanium directly. Hypothetically, the reactions of direct titanium oxidation could be represented in simplified form as follows:

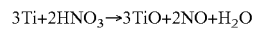

3Ti+2HNO₃→3TiO+2NO+H₂O or:

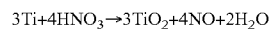

3Ti+4HNO₃→3TiO₂+4NO+2H₂O

Presumably, and in one embodiment, the mechanism of forming titanium oxides is as follows: in the precursor alloy, manganese to titanium atomic ratio for αMn solid solution is about 9:1. Along the leaching operation, nine atoms of manganese react with nitric acid forming some diluted in acid ions and leaving one atom of titanium which apparently is easily oxidized. Oxidized atoms of titanium along the leaching process are being crystallized and they form already the titanium oxide crystals.

In one embodiment, the specific surface area of the final titanium oxide particles is more than 70 m²/g. In one embodiment, the specific surface area of the final titanium oxide particles is more than 100 m²/g. In one embodiment, the purity of the titanium oxide particles is more than 99.7%.

In one embodiment, forming the alloy comprises mixing a solid comprising the first metal with a solid comprising the second metal. Following mixing, the solids are heated and melted. In one embodiment, the melting temperature used to form the alloy is 950° C. In one embodiment, the melting temperature used to form the alloy ranges between 900° C.-1000° C. In one embodiment, the melting temperature used to form the alloy is around 2000° C., or it ranges between 1670° C. and 2000° C., or it ranges between 1800° C.-2200° C., or it ranges between 1900° C. and 2100° C. In one embodiment, the melting temperature used in the process of forming the alloy is any temperature above the melting point of Ti. In one embodiment, the melting temperature is or above 1670° C. In one embodiment, the melting temperature used in the process of forming the alloy is any temperature above the melting point of the first metal(s) used for forming the alloy. In one embodiment, the melting temperature used in the process of forming the alloy is any temperature above the melting point of the second metal(s)) used for forming the alloy.

In one embodiment, melting is conducted under a protective atmosphere. In one embodiment with no protective atmosphere both Ti and Mn (or other first and second metals) will be oxidized.

In the process of forming the alloy, following the step of heating the metals to form an alloy, the alloy is cooled in one embodiment.

In one embodiment, following the step of forming the alloy or following the step of providing an alloy, a heat treatment of the alloy is conducted.

In one embodiment, the heat treatment temperature ranges are between 815° C. and 850° C. or between 900° C. and 1000° C. In one embodiment, the heat treatment temperature is 830° C.+/−15° C., or 950° C.+/−15° C. In one embodiment, the heat treatment temperature is up to 950° C.+/−15°

C. Other heat treatment temperatures can be used in embodiments of this invention. In one embodiment, the heat treatment temperature used in methods of this invention is any temperature suitable for the first metal(s) and/or for the second metal(s)) used for forming the alloy.

In one embodiment, the heat treatment results in controlled phase content of the metals in the alloy.

In one embodiment, the time range for reaching the heat treatment temperature is 20-30 min Lower or higher time ranges are applicable to methods of this invention.

In one embodiment, soaking means keeping at a certain temperature. In one embodiment, soaking time is the time during which the alloy is kept at a certain temperature during the heat treatment. In one embodiment, soaking time is determined by experiment. In one embodiment, the soaking time is determined by the time needed to obtain a certain first metal(s) structure. In one embodiment, soaking time is the time required to reach Alpha Ti structure. In one embodiment, soaking time may vary depending on the metals used. In one embodiment, soaking time depends on other experimental parameters.

In one embodiment, following heat treatment, the alloy is cooled by quenching. In one embodiment, water quenching is a very fast process of cooling of the ingot in water. In one embodiment, the water quenching time is of the order of a few seconds. Other quenching times are applicable in embodiments of this invention. Ingot refers to the piece of metal alloy following melting.

Leaching: the acid concentration used for leaching and the leaching temperature, are important parameters for controlling the final product structure. A wide range of acid concentration and leaching temperatures may be used with methods of this invention. In one embodiment, acid concentration is up to 50%. In one embodiment, leaching temperature is up to 60° C. Many rinsing methods are applicable to rinse the metal-oxide after leaching. In one embodiment, nutsche vacuum filter is used.

Various drying and annealing temperatures may be used in methods of this invention for drying and for annealing the metal oxide particles formed.

In one embodiment, the metal base purity of the metal oxide particles formed is >99%. In one embodiment, the metal base purity of the metal oxide particles formed is >99.7%. In one embodiment, the metal base purity of the metal oxide particles formed is >98%, or >96%, or >95%, or >99.9%, or >99.5%, >99.4%, or >90%.

In one embodiment, alloys used in processes of the invention comprise 1-50 wt % of the first metal and 50-99 wt % of the second metal. Other metal percentages may be used in methods of this invention. In one embodiment, the percent is a weight percent.

In one embodiment, following the leaching process, the second metal is recycled.

In one embodiment, submicron particles are nano-sized particles. In one embodiment, submicron particles are particles that can be characterized by dimensions (or at least one dimension) of less than 1 micron. In one embodiment, the submicron particles are super-fine particles. In one embodiment, a powder comprising the submicron particles of this invention is referred to as super-fine powder. In one embodiment, nano-sized particles are particles with at least one dimension in the range of 1-1000 nm. The dimension range of nano-sized particles of this invention is between 1 nm and 1000 nm, between 1 nm and 500 nm, or between 1 nm and 100 nm in some embodiments of this invention.

In one embodiment, products of this invention comprise nanoparticles. In one embodiment, products of this invention comprise clusters (aggregates) of the nanoparticles of this invention. Clusters of particles comprise a collection of nanoparticles as shown for example in FIG. 1. In one embodiment, products of this invention comprise collection(s) of nanoparticles of this invention. In one embodiment, specific surface area of the particles is measured for a collection of particles. In one embodiment, specific surface area of the particles is measured for a collection of clusters of particles. In one embodiment, specific surface area of the particles is measured for a powder comprising collection of clusters of particles of this invention.

One or more first metal(s) means that the first metal (the metal that is being oxidized to form the metal-oxide nanoparticles) can comprise more than one metal. For example, where M is a metal, the "first metal" comprises M1 and M2 metals. These two metals form metal oxide particles according to methods of this invention. According to this aspect and in one embodiment, metals M1 and M2 are mixed with a third metal (M3) to form an alloy. Following the leaching process described in methods of this invention, wherein metal M3 is being removed and metals M1 and M2 are oxidized, particles comprising M1 and M2 are formed in one embodiment. In one embodiment, a single particle comprises M1 and M2. In one embodiment, a collection of particles comprise particles each comprising M1 and M2.

In one embodiment, where the first metal(s) comprises more than one metal, a metal oxide product comprising oxide of more than one metal is formed according to methods of this invention. Metal oxide nanoparticles comprising oxides of more than one metal are formed according to embodiments of this invention. Such oxides are complex oxides in one embodiment. For example, apparently it is possible to produce nano-particles of titanium-iron oxide (ulvospinel) where the first metals of the alloy will be titanium and iron and the second metal is manganese.

Purity in the context of this invention is metal-base purity. Metal base purity describes the purity of the metal in a material. The purity of the metal is the amount of a certain metal from the total amount of metals in the material. The metal base purity is measured by ICP in some embodiments. The amount of a certain metal as compared with the total amount of all metals in a material can be expressed in %. For a metal-oxide material, the metal base purity does not include the amount of oxygen in the material. For example, for titanium oxide particles of this invention, the metal base purity indicates the amount of titanium as compared with the total amount of metals in the titanium oxide particles. For example, 99% metal base purity of titanium oxide means that 99% of the metals in the metal oxide product (particles) is titanium.

For example, ICP data for a certain product sample are shown in Example 2 herein below. As it follows from the ICP data, the amount of residual Mn is about 0.17%. The total amount of other impurities is no more than 0.1%. Accordingly, the purity of the titanium oxide powder in this sample is more than 99.7%.

In some embodiments, if % is mentioned for chemical concentration, the percent is wt %.

Metal oxide is referred to the oxide or oxides of the metal. The metal oxide may include more than one type of oxide structure and may include more than one metal oxide formula. For example, the titanium oxide product (the titanium oxide collection of particles) may include $TiO_2$ and TiO. Both $TiO_2$ and TiO are metal oxides. Both $TiO_2$ and TiO are titanium oxides. A collection of titanium oxide particles of this invention may include different $TiO_2$ phase or phases and different TiO phase or phases. Collections of particles comprising only one phase can be formed by methods of this invention. In one embodiment, in a given collection of particles, each individual particle is homogeneous in terms of crystalline phase. For example, in some embodiments, in a collection of particles, some particles are $TiO_2$ particles of a certain phase and other particles are TiO particles of a certain phase.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%.

EXAMPLES

Example 1

Preparation of Titanium Oxide Powder Comprising Nano-Sized Particles

For melting of a starting Mn—Ti alloy used for manufacturing of the titanium oxide powder the following raw materials have been used:
1. titanium: in a powder form, <45 micron, 99.98% purity from Sigma-Aldrich (product #366994).
2. manganese: in granules form, 0.8-12 mm size, purity 99.98% from Alpha-Aesar.

The composition (in weight %) of the starting alloy was: 8% Ti-92% Mn.

Melting of the alloy was carried out in a laboratory Argon/Vacuum Arc Melting Furnace under Argon protective atmosphere.

Heat Treatment was carried out in a batch type electric furnace under argon protective atmosphere at a temperature of 950° C. Time for reaching 950° C. was 30 min and soaking time was 2 hours. Soaking was followed by water quenching. According to XRD data the alloy crystalline structure after heat treatment corresponds to αMn solid solution.

Surface cleaning of the heat treated alloy was carried out at room temperature in 15% $HNO_3$ and after that in 96% ethyl alcohol. The main goal of this operation is to dissolve the manganese oxide and manganese hydroxide film and also other impurities which could be formed along the water quenching operation.

Leaching of manganese was carried out in 15% $HNO_3$ at a temperature of 30-40° C. The operation was completed in 8 hours. Any traces of hydrogen above the $HNO_3$ surface were not found.

Rinsing by DI water to a neutral reaction was carried out by decantation.

Drying was carried out in a drying cabinet at a temperature of 70° C. The powder was then annealed at temperature 450° C. for two hours.

The final product of the described above technological procedure has morphology of titanium oxides nano powder porous clusters (see FIG. 1). The chemical purity of the final product depends on the purities of the raw materials. In this case the residual Mn content is approximately 0.15% and the total metal base purity of the nano size titanium oxide powder is no less than 99.7%. Specific surface area measured by low temperature adsorption of nitrogen (BET method) is about 150 m²/g.

Figure 3:
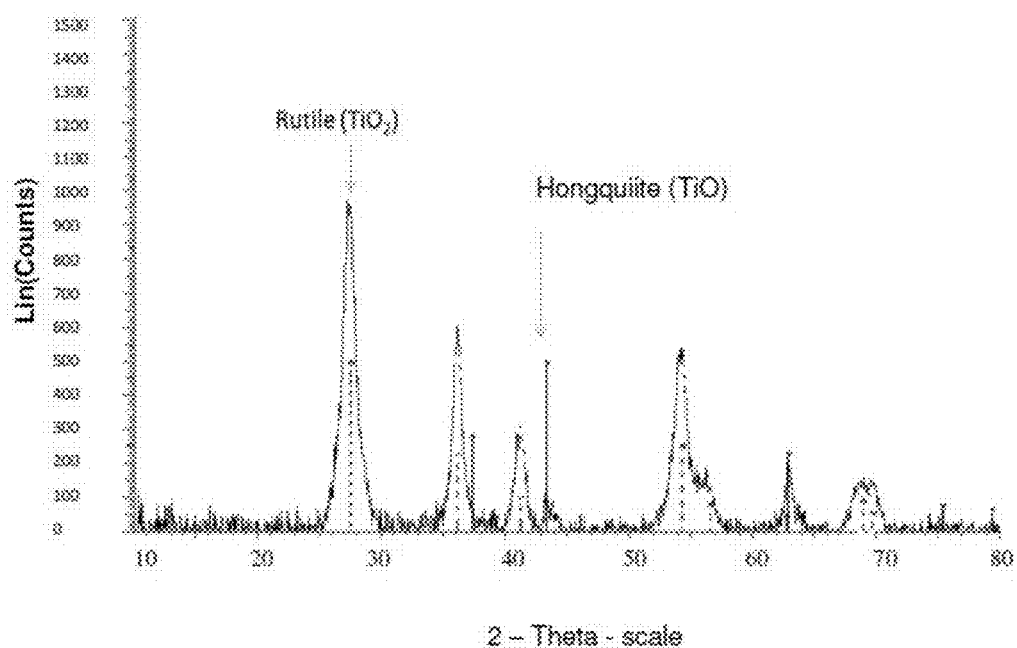
FIG. 3 is XRD diagram of the titanium oxide nano powder manufactured according to the procedure described in Example 1. As can be seen from the diagram, the particles have two types of crystalline structure: titanium dioxide ($TiO_2$) having rutile crystalline structure and small amount (no more than 10%) of titanium monoxide (TiO) having cubic crystalline structure. The breadth of all of the diffraction peaks for $TiO_2$ is quite broad, what means that the size of crystallites (or primary particles) of $TiO_2$ is significantly less than one micron.

The phase composition of the powder consists of two crystalline phases: titanium dioxide ($TiO_2$) having tetragonal rutile crystalline structure and titanium oxide (TiO) having cubic crystalline structure (FIG. 3). Annealing of this powder at a temperature in the range of 300° C.-1100° C. is possible.

Example 2

Microwave-Assisted Acid Digestion and ICP-AES Analysis of Ti Alloy Powder

A product sample comprising titanium oxide particles was tested for the metal content. The results are summarized in the following table:

| Element | mg/kg |
|---|---|
| Al | 36.6 |
| Ca | 209 |
| K | 38.9 |
| Mg | 472 |
| Mn | 1784 |
| Mo | 28.3 |
| Na | 11.3 |
| Si | 247 |
| Ti | 474005 |
| Zn | 10.2 |

Sample preparation and measurement. A batch of sample (about 20 mg) was digested in 7 ml of $HNO_3$ 65%, and 3 mL of $H_2SO_4$ 98%. Digestion was carried out in quartz vessels using a "Discover" sample digestion system at high temperature and pressure (CEM, USA). Vessels were cooled down and the volume was made up to 25 ml with deionized water. The sample was dissolved completely. Element concentration was measured in the clear solutions using an End-On-Plasma ICP-AES model 'ARCOS' from Spectro GMBH, Germany. Measurements were calibrated with standards for ICP from Merck. The continuing calibration verification standard was measured to check the instrument stability.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. Metal oxide clusters which comprise metal oxide particles at a size range between 3 nm and 200 nm,
   wherein the metal-oxide particles form a nano-porous structure and have a specific surface area that is larger than 70 m²/g,
   wherein the metal in said metal oxide particles includes Cu and Co, and
   wherein the crystalline structure of said metal oxide particles is perovskite, spinel or spinel-like.

2. The metal oxide clusters of claim 1, wherein the specific surface area of said metal oxide particles is larger than 100 m²/g and the crystalline structure of said metal oxide particles is spinel.

3. Metal oxide clusters which comprise metal oxide particles at a size range between 3 nm and 200 nm, and have a rounded shape, wherein the metal-oxide particles form a nano-porous structure and have a specific surface area that is larger than 70 m$^2$/g, wherein the metal(s) in said metal oxide particles comprise Ti, Fe, Zr, Hf, Cu, Co, Cr, Ni, Mo, La, Nb, Ta, W, V, or combinations thereof, and wherein the crystalline structure of said metal oxide particles is perovskite, spinel or spinel-like, wherein the metal oxide particles comprise titanium oxide particles.

4. The metal oxide clusters of claim 3, wherein said metal oxide particles are catalytically active and a metal-base purity of said metal oxide particles is greater than 99%.

5. The metal oxide clusters of claim 3, wherein the nano-porous structure has an average pore size of between 5-100 nm.

6. The metal oxide clusters of claim 3, wherein said titanium oxide particles comprise TiO$_2$ or a mix of TiO$_2$ with crystalline TiO.

7. The metal oxide clusters of claim 3, wherein a specific surface area of said metal oxide particles is larger than 100 m$^2$/g.

8. The metal oxide clusters of claim 3, wherein a maximal particle size of the metal oxide particles is at most ten times a minimal particle size thereof.

9. The metal oxide clusters of claim 8, wherein an average particle size of the metal oxide particles is between 10-100 nm.

10. A powder comprising the metal oxide clusters of claim 3.

11. The powder of claim 10, wherein the metal oxide particles are produced from an alloy of at least two metals, which is optionally subjected to a heat treatment operation and is leached to remove at least one of the metals and to oxidize at least another one of the metals.

12. The metal oxide clusters of claim 3, having a cluster size between 0.05 microns and 50 microns.

13. The metal oxide clusters of claim 3, having a total porosity ranging between 25%-80%.

14. A chemical catalyst in powder form comprising metal oxide clusters which comprise complex metal oxide particles at a size range between 3 nm and 200 nm, wherein the metal oxide clusters have a rounded shape, and form a nano-porous structure having a specific surface area larger than 70 m$^2$/g, wherein the complex metal oxide particles comprise Ti, wherein the crystalline structure of said metal oxide particles is perovskite, spinel or spinel-like, and wherein a metal-base purity of said metal oxide particles is greater than 99%.

15. A catalyst for chemical processes comprising the metal oxide clusters of claim 4.

16. The metal oxide clusters of claim 14, wherein the nano-porous structure has an average pore size of between 5-100 nm.

17. The metal oxide clusters of claim 14, wherein an average particle size of the metal oxide particles is between 10-100 nm.

18. The metal oxide clusters of claim 14, having a cluster size between 0.05 microns and 50 microns.

19. The metal oxide clusters of claim 14, having a total porosity ranging between 25%-80%.

* * * * *